Oct. 8, 1929.  W. F. ROCKWELL  1,730,900
DIFFERENTIAL AXLE CONSTRUCTION
Filed Feb. 1, 1926   5 Sheets-Sheet 2

Inventor
Willard F. Rockwell
William A. Strauch
By   Attorney

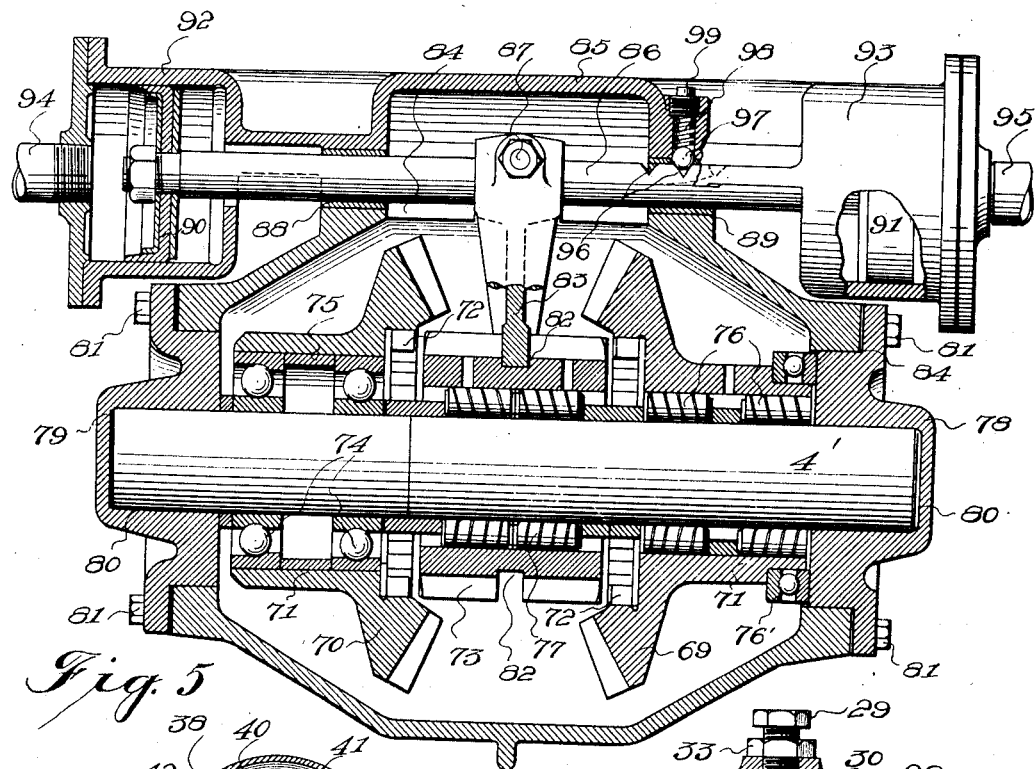
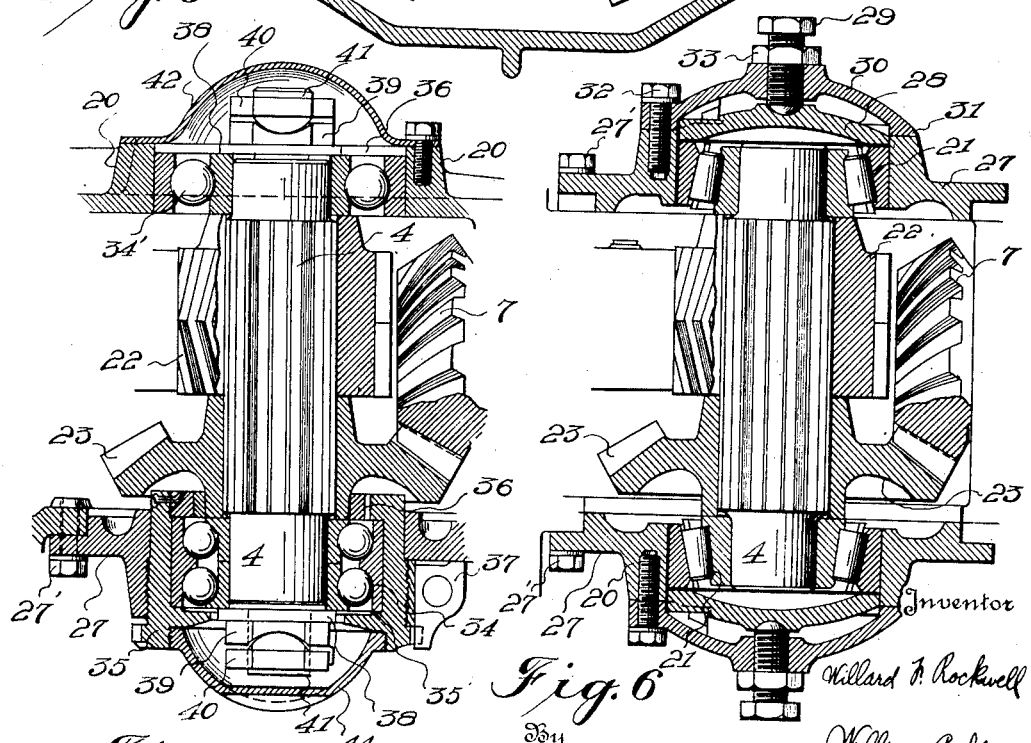

Patented Oct. 8, 1929

1,730,900

UNITED STATES PATENT OFFICE

WILLARD F. ROCKWELL, OF OSHKOSH, WISCONSIN, ASSIGNOR TO WISCONSIN PARTS COMPANY, OF OSHKOSH, WISCONSIN, A CORPORATION OF WISCONSIN

DIFFERENTIAL AXLE CONSTRUCTION

Application filed February 1, 1926. Serial No. 85,273.

The present invention relates to improved axle constructions.

More particularly the invention relates to improved double reduction and reversing differential axle constructions especially useful for bus axles, and the present application constitutes a continuation in part of my copending applications Serial Number 588,926 filed September 18, 1922, (now Patent #1,571,800), Serial Number 599,328 filed November 6, 1922, and Serial Number 741,693 filed October 4, 1924, now Patent #1,571,801.

A primary object of my invention is to provide an improved and simplified axle construction which can be produced at a minimum cost and which can be readily assembled and disassembled, and which can be produced with a minimum number of separate set ups in machining operations. Preferably the reduction and differential gearing are mounted in a single encasing gear housing which can be removed from the load carrying or axle housing as a unit. In order to provide for a construction especially suitable for low bus or road vehicle constructions, the axes of all the shafts in preferred forms of my invention are located substantially in the same plane.

A further object of the invention is to provide a differential axle construction in which a bevel gear double reduction train is utilized with interchangeable axle or wheel driving shaft sections. In prior bevel gear double reduction arrangements, it has been the practice to make the axle shafts or sections of different length so that the propeller or primary shaft section could be located centrally in the vehicle chassis and all of the reduction gearing housed in a minimum space. As a result of such constructions the axle shafts of prior bevel gear double reduction axles are not interchangeable. This necessitates maintenance of increased stocks of axle shafts for producing and servicing this type of axle, increases the cost thereof and considerable confusion and delay results when breakages occur in service due to the habit of referring to the axle shaft sections as right and left rather than as the long and short sections. In accordance with the present invention a bevel gear double reduction axle is produced in which the reduction gearing and the differential mechanism are specially constructed and compactly arranged to permit the utilization of interchangeable axle shaft sections. This provides a highly useful combination in which the cost of production and the number of parts carried for servicing are reduced to a minimum.

A further object of the invention is to provide a novel construction for double reduction reversing bus axles especially adapted for use with special types of non-reversing transmissions and gas-electric drive arrangements.

Still further objects of the invention will appear in the following detailed description of preferred embodiments of the invention and are such as may be attained by a utilization of the various combinations, sub-combinations, and principles more fully hereinafter set forth and as defined by the terms of the appended claims.

As shown in the drawings:

Figure 5 is a vertical cross-sectional view through the reversing gearing of Figures 3 and 4 taken on the line A—A of Figure 4 with parts of the operating means shown in elevation.

Figures 6 and 7 are horizontal sections showing modified forms of removable and adjustable mountings for the intermediate shaft.

Figure 1:
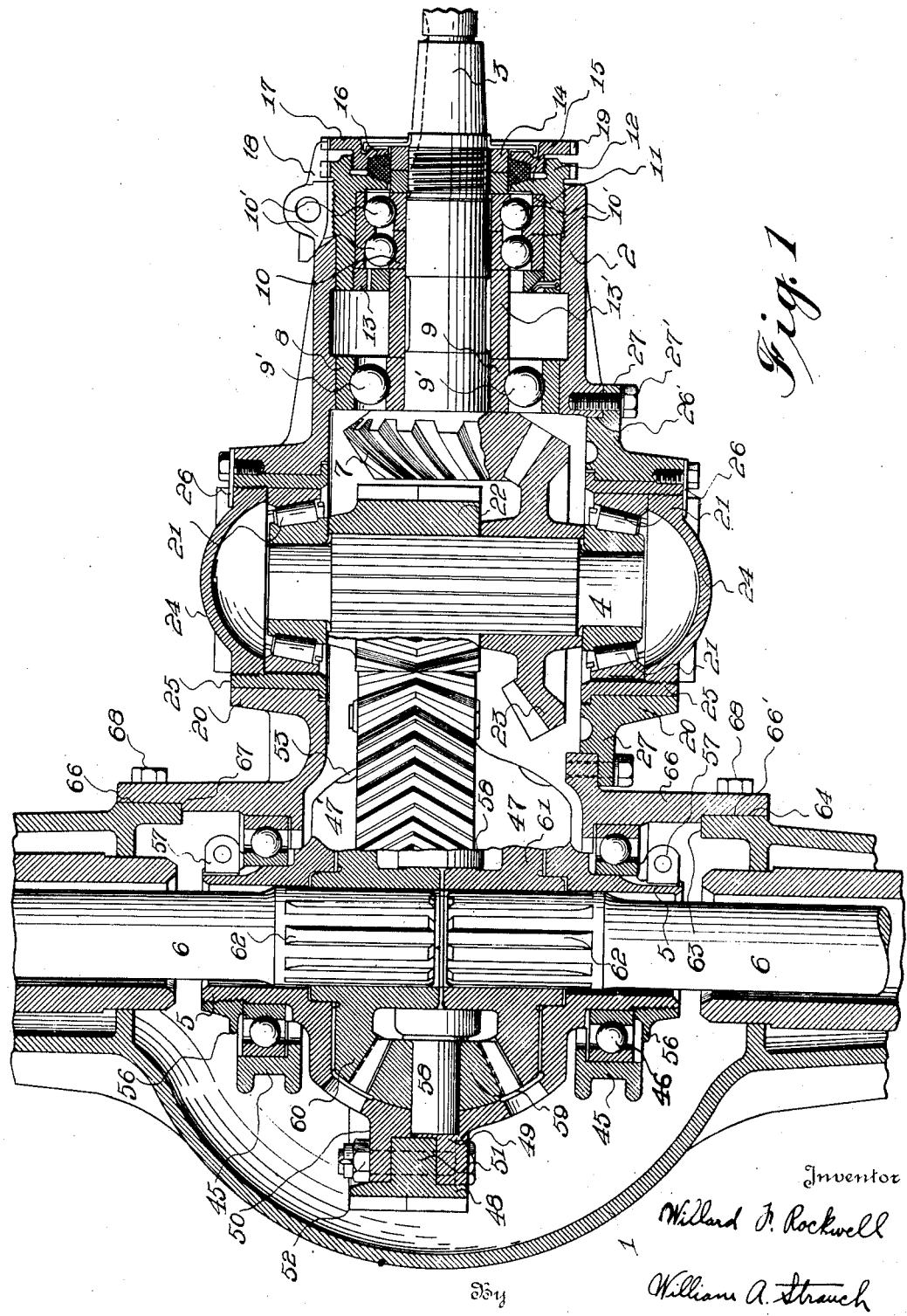
Figure 1 is a central horizontal section of one form of my invention.
Figure 2:
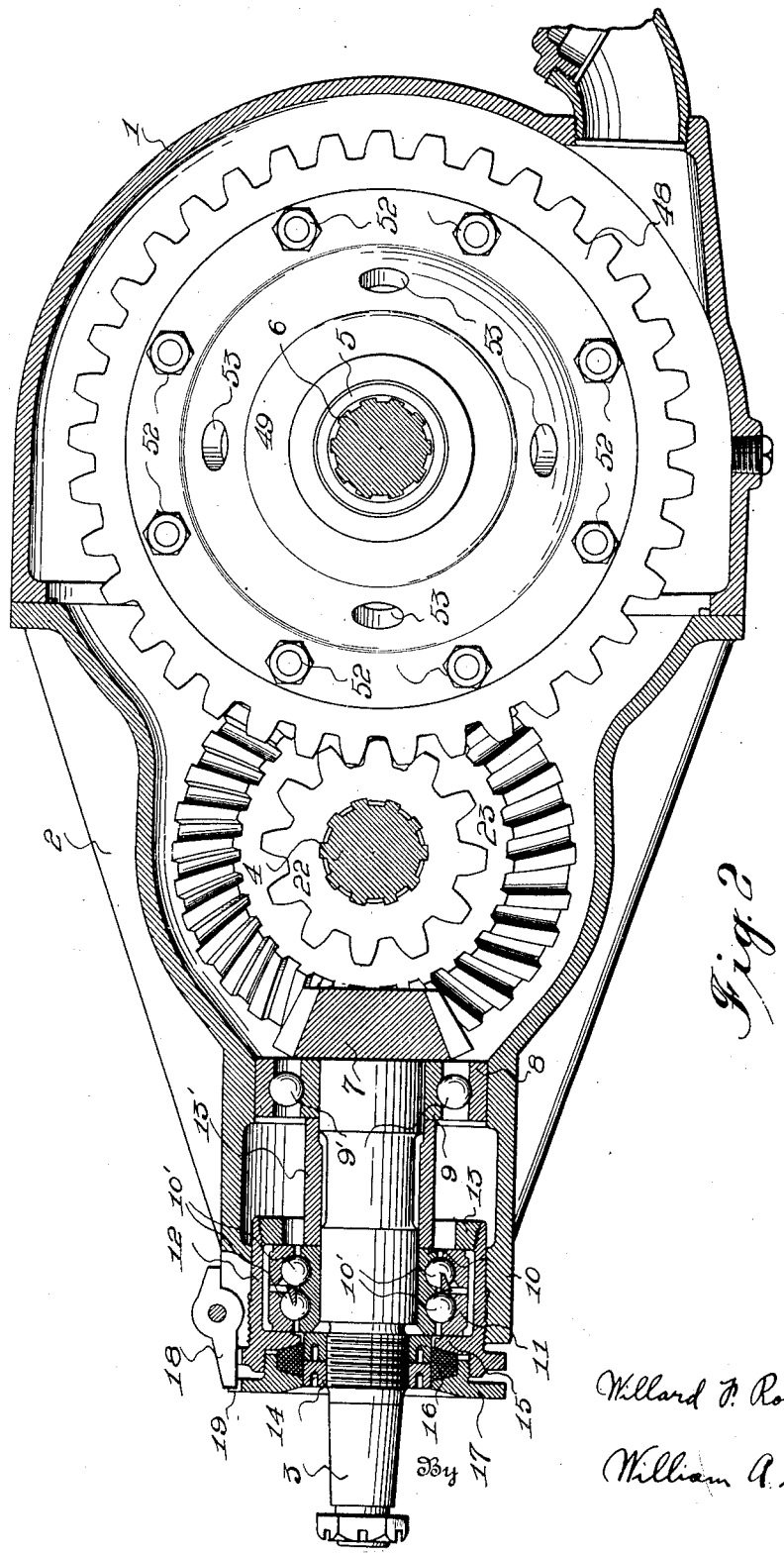
Figure 2 is a vertical section of the form of invention shown in Figure 1.
Figure 3:
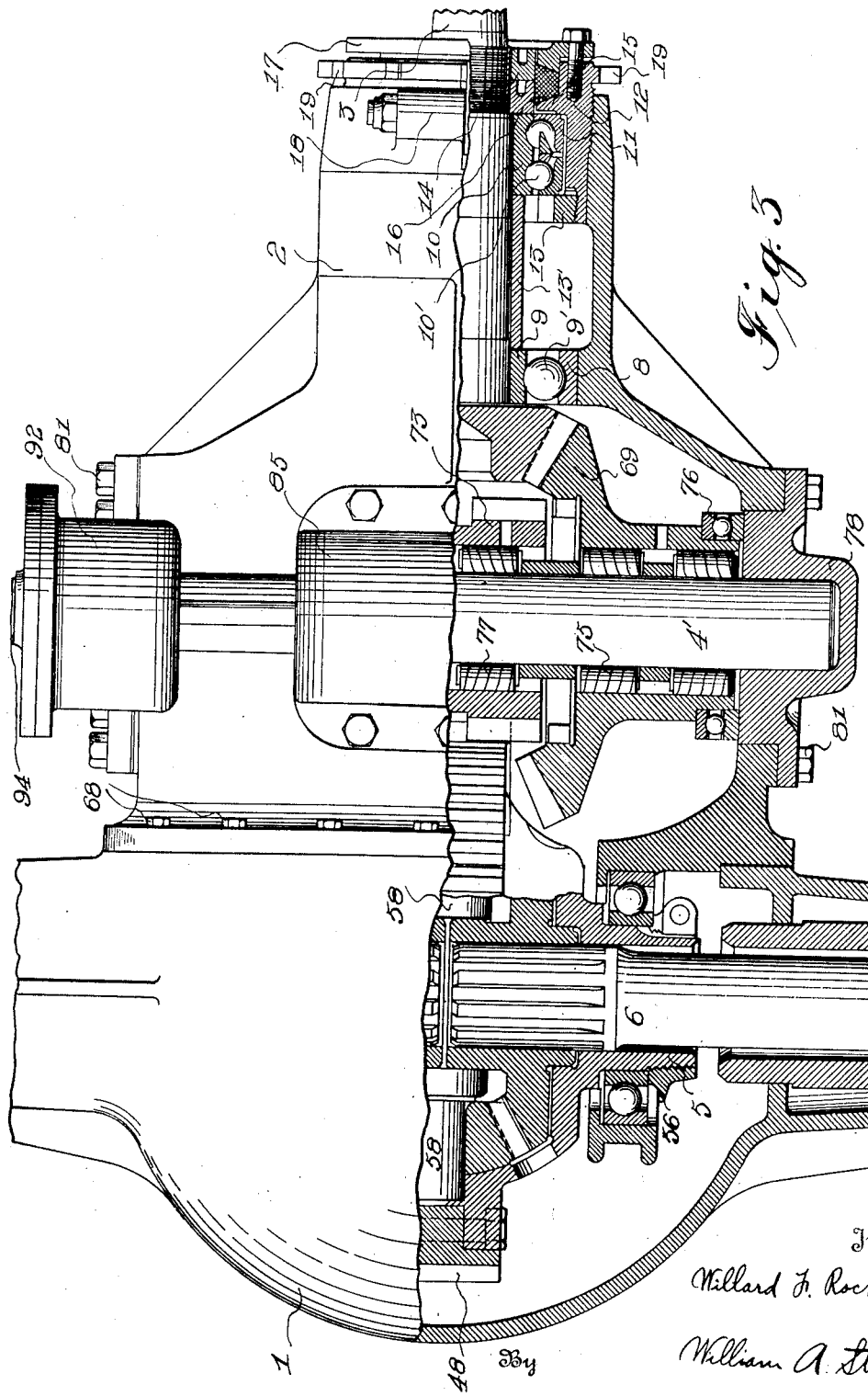
Figure 3 is a plan view of a modified form of axle construction embodying a reversing mechanism with parts broken away to show the construction in horizontal section.
Figure 4:
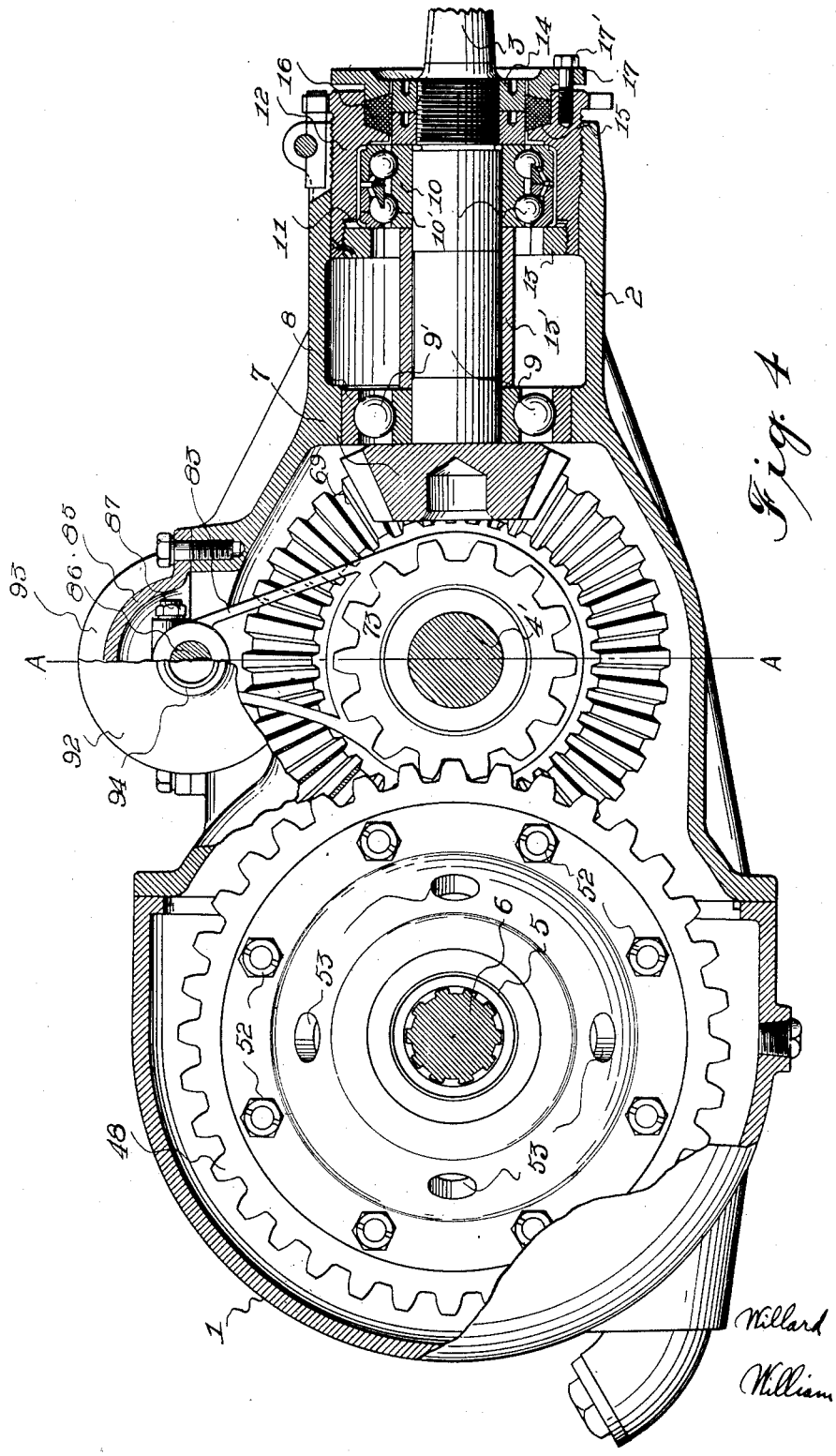
Figure 4 is a vertical section of the construction shown in Figure 3.

Referring to Figures 1 and 2, 1 indicates the axle or load supporting housing, 2 the gear supporting housing, 3 the primary driving shaft or propeller shaft section, 4 the intermediate shaft and 5 the hollow differential supporting hubs or extensions. Hubs 5 support the differential housings as will more fully hereinafter appear. Slidably and rotatably supported in the hollow extensions 5 are the enlarged ends of the axle wheel driving shafts 6. Formed integrally with or secured to the inner end of shaft section 3 is a bevel pinion 7. Shaft 3 is adjustably supported in the forward cylindrical end of housing 2 by means of suitable ball or anti-friction bearing comprising a hardened ball race 8 rigidly supported in casing 2 and a ring 9 supporting shaft 3 on the balls 9'. The forward end of shaft 3 is supported on split rings 10 of an anti-friction ball thrust bearing. Rings 10 are supported on balls 10' which in turn are supported on the thrust race 11 secured in the adjusting sleeve member 12 by means of the threaded retaining member 13. An adjusting and spacing sleeve 13' surrounding shaft 3 is interposed between rings 9 and 10. The bearing supporting and adjusting sleeve 12 is threaded externally and screws into the end of housing 2 and rings 9, 10 and member 13' are held in assembled relation on shaft 3 by means of the threaded securing and locking collars 14. Sleeve 12 is provided with an annular shoulder 15 against which a packing member 16, such for example as a felt washer is held by means of a packing gland 17 threaded into the end of sleeve 12, or secured by means of cap screws 17' as shown in Figs. 3 and 4 if desired. Sleeve 12 and gland 17 are locked in position by means of a locking dog 18 pivotally mounted on housing 2 and adapted to seat in locking notches 19.

Gear housing 2 is provided with lateral hollow tubular extensions 20 whose common axis preferably lies in the same plane as the axis of the drive shaft 3. In these extensions the intermediate shaft 4 is removable mounted. In the preferred form shown in Figure 1, the intermediate shaft is provided with reduced end extensions supported in the roller or anti-friction bearings 21 which in turn are slidably supported in the tubular extensions 20. Shaft 4 is longitudinally splined or grooved and slidably supported thereon are the suitably splined or grooved spur pinion 22 and the bevel gear 23. Bevel gear 23 meshes with and is driven by the bevel pinion 7 transmitting the motion of primary shaft 3 to the intermediate shaft 4.

The gears and bearings are slid endwise upon the intermediate shaft 4 in a subassembly and are secured in housing 2 by caps 24 screwed into threaded tubular bushings 25 of suitable metal pressed into the extensions 20 of the gear housing. It will be observed that by this arrangement the shaft 4 can readily be removed from the gear housing without removing pinion 22 or gear 23 upon removal of a cap 24. It will be observed further that adjustment of the gears may be effected by manipulation of the caps 24 which constitute abutments for the bearings 21. Inadvertent rotation of the caps 24 is prevented by fingers 26 secured to the housing by means of cap screws and engaging suitable depressions in caps 24. Both extensions 20 may be formed integrally with the housing. Preferably, however, an opening 26' is provided at one side of housing 2 of sufficient diameter to permit removal of the gear 23. A sub-assembly supporting cover 27 for opening 26' supports one extension 20 as shown in Figure 1 and is secured to housing 2 by means of stud bolts 27'. By this arrangement the entire sub-assembly including the intermediate shaft 4, bearings 21, pinion 22 and gear 23 may be removed from the gear housing by removing bolts 27' and cover plate 27.

If desired both extensions 20 may be formed on detachable caps 27 as illustrated in Figure 6 of the drawings. Or, as illustrated in this figure the intermediate bearings and gears may be held in assembled relation to shaft 4 by adjustable plates 28 constituting abutments for bearing 21. Plates 28 may be readily adjusted by screws 29 threaded centrally through caps 30 secured to end surfaces 31 of extensions 20 by cap screws 32. Lock nuts 33 are provided to maintain the adjustment of screws 31.

In lieu of roller bearings 21, I may employ ball bearings for the intermediate shaft 4 as shown in the modification represented in Figure 7. In the form shown in this figure, one end of shaft 4 is supported in a ball thrust bearing 34 secured in a sleeve 35, between a shoulder 35' and a retaining ring 36 threaded into one end of sleeve 35. Sleeve 35 is threaded into a cap 27 secured to housing 2 by bolts 27' and is held from inadvertent turning by a dog 37 engaging one of the series of notches provided in the periphery of sleeve 35. The other end of shaft 4 is rotatably supported on roller bearing 34'. The bearings 34, 34' and the gears 22 and 23 are held from endwise movement on the shaft by abutment washers 38. Washers 38 are adjustably held in position by adjusting nuts 39 and lock nuts 40 threaded on extensions 41 of shaft 4. A cap 42 is secured to the end of extension 20 and covers one end of the shaft 4. The other end of shaft 4 is protected by a cap 44 threaded in the sleeve 35. It will be observed that this modification permits the same ready removal and adjustment of the intermediate shaft and adjacent parts that is characteristic of the other forms above described, and that the intermediate shaft and gears are mounted as a removable sub-assembly on cap 27.

Supported in extensions 45 of housing 2 are anti-friction or roller bearings 46. Hubs or extensions 5 of the differential housings 47 and 47' are supported with the axes of rotation of hubs 5 at right angles to and preferably in the plane of the axis of primary shaft 3. Differential ring gear 48 meshing with pinion 22 on intermediate shaft 4 is secured to differential flanges 49 and 50 of housing sections 47 and 47' by means of an inwardly extending peripheral flange 51 on gear 48 and bolts 52. Housing sections 46 and 47 are provided with openings 53 to permit the flow of lubricant from the axle housing to the differential gears.

The ends of hubs 5 project through the bearings 46 and are threaded externally, the differential mechanism and bearings 46 being held in position by collars 56 threaded on spindles 5. Collars 56 are held from inadvertent turning by dogs 57 supported from extensions 45 engaging notches in the periphery of the collars.

It will be noted that the housing sections are not duplicates, that is, the ring gear 48 is not centrally located with respect to the ends of the differential hubs 5. Nevertheless the arrangement of the gears within the differential housing is symmetrical with respect to a vertical plane including the axis of the driving shaft 3. To this end studs or spindles 58 are rotatably mounted in differential housing section 47 with their axes in the vertical plane of shaft 3. Mounted on studs or spindles 58 are bevel pinions 59 meshing with bevel gears 60 and 61 slidably splined to the inner ends of axle or wheel driving shafts 6 through the splined ends 62 thereof. By the arrangement just described interchangeable axle shafts 6 may be used, axle shafts 6 being duplicates in construction and length.

Axle or load supporting housing 1 is provided with a central opening 63 and a flat or plane supporting and locating surface 64 to receive and properly locate the gear housing. It will be observed that locating surface 64 is in a plane that is normal or perpendicular to axis of primary driving shaft 3 and preferably to a plane comprising all of the shaft axes. Gear housing 2 is provided with an attaching flange 66 recessed on its under surface to provide a locating tongue or shoulder 67 that engages the finished or machined wall of the opening 63 in the axle housing and serves to locate or center the gear housing 1. Flange 66 is also provided with a finished or machined surface 66' in a plane perpendicular or normal to the axis of shaft 3 and is secured to the axle housing by bolts or studs 68. It will be understood that the remainder of the axle not specifically described may be of any well known type. By supporting all of the shafts in the gear housing with a locating plane perpendicular to the axis of the primary driving shaft, a construction is provided that may be produced with a minimum of machining operations. The locating surfaces and the bearing surfaces for the driving shaft can be machined in one set up, providing satisfactory supporting surfaces for the machining of the bearing surfaces for the other shafts. Moreover, by this arrangement a construction is provided that is extremely simple and practical and in which replacements can be made with the minimum of expense.

I may employ a reversing mechanism in connection with my improved axle construction when desired. The preferred form of this construction is shown in Figures 3, 4 and 5. It will be noted that in this form of the invention the driving, intermediate and differential shafts have their axes in the same plane and that the construction of the driving shaft is substantially the same as that above described, and that the construction of the differential differs therefrom only in that the ring gear has ordinary spur teeth, instead of the herring bone type. The reversing mechanism is carried by or associated with mechanism on the intermediate shaft.

The bevel pinion 7 in this construction (Figs. 3, 4 and 5) meshes with bevel gears 69 and 70, rotatably mounted upon the intermediate shaft 4' which in this case is circular in transverse section. The bevel gears 69 and 70 are provided with elongated tubular extensions 71 and with internal teeth 72. It will be readily understood that the gears 69 and 70 rotate normally in opposite directions. Between gears 69 and 70 and slidable upon the shaft 4' is a wide spur gear 73. This gear meshes with the ring gear 48 of the differential at all times. The teeth on the gear 73 are adapted to mesh with internal teeth 72 carried upon the bevel gears 69 and 70, and it will be apparent that when the gear 73 engages the teeth of bevel gear 69 the differential will be driven in one direction, and that when said gear engages the bevel gear 70 it will be driven in the opposite direction, while in neutral or, intermediate position pinion 73 will idle.

Gear 70 is rotatably mounted on the intermediate shaft by ball bearings 74 separated by a spacing sleeve 75. Gear 69 is supported on roller bearings 76 and endwise thrust against the cap, presently to be described, is taken by a thrust bearing 76. The gear 69 transmits the motion in a forward direction and it is for this reason that the arrangement just described is provided. For the limited service to which the reversing gear is put the ball bearings shown are sufficient to withstand the thrust in a direction longitudinally of the shaft.

Spur pinion 73 is mounted on roller bearings 77 upon which it may be readily slid into engagement with either of the bevel gears 69 or 70 or in its neutral position.

All of the parts just described are slidable endwise on intermediate shaft 4' and are unsecured against endwise movement on said shaft except by caps 78 and 79 provided with hollow bosses constituting seats 80 for the ends of said shaft. Caps 78 and 79 constitute removable abutments holding the parts carried by the shaft in position thereon and are secured to the gear housing by cap screws 81. It will be readily appreciated that the intermediate shaft is accessible and removable upon removal of caps 78 and 79.

The gear 73 is provided with a circumferential recess 82 to receive a yoke 83 for shifting it laterally into engagement with either of the adjacent bevel gears 69 or 70, or to return it to neutral position. The yoke 83 may be reciprocated in any manner but I prefer to employ fluid pressure to effect this result.

Communicating with an opening 84 in the top of the gear housing 2 is a housing 85 carrying the means for shifting the gear 73. The gear shifting yoke 83 is clamped to a rod 86 extending parallel to the intermediate shaft and arranged to slide through bushings 88 and 89 of the housing 85.

Secured at opposite ends of the rod 86 are pistons 90 and 91 arranged to reciprocate in cylinders 92 and 93 cast as a part of the housing 85. Fluid pressure preferably air or a suction is applied through pipes 94 and 95 from a suitable source. It will be readily understood that upon application of pressure or a suction to either of the cylinders the rod 86 will be moved to either of its positions causing pinion 73 to mesh with the internal teeth on either of bevel gears 69 or 70. In order to hold the rod in adjusted position so that the pressure against pistons 90 and 91 may be released after the gear 73 is shifted into the desired position, the rod 86 is provided with three notches 96 corresponding to each operating position of the rod. A ball 97, pressed inwardly by a coil spring 98 adjustably secured in a recess in the housing by a threaded plug 99, yieldably engages the notches. This arrangement permits endwise movement of the rod as the inclined sides of the notches wedge the ball 97 into its socket upon the application of pressure to the end of the rod. When the rod reaches the desired position the ball springs into the corresponding notch and serves to hold it from inadvertent endwise movement. The pressure may then be released.

From the foregoing descriptions the manner of operation of my inventions will be readily understood. It will be seen that axle constructions are provided of the double reduction type that are simple and in which reduction gearing may be readily assembled, adjusted or replaced without disturbing the load carrying or axle housing; that constructions are provided in which interchangeable axle sections may be used; that the gear supporting housings may be produced at a minimum cost; and that an improved reversing mechanism is provided.

While I have shown several practical and satisfactory embodiments of my invention, it should be understood that my invention is not limited to these forms, but includes such other constructions as fall within the scope of the appended claims.

What I claim as my invention is:

1. A double reduction axle construction comprising a gear housing; an axle housing; a drive shaft, an intermediate shaft and a differential housing supported in said gear housing and mounted for removal as a unit therewith, the axes of said drive shaft and the intermediate shaft lying in substantially the same horizontal plane; said differential housing carrying a ring gear that is offset with respect to the drive shaft; differential gears mounted with said differential housing for rotation therein; and interchangeable axle sections in said axle housing, the ends thereof being supported in the differential housing and driven by said differential gears, said gear housing being secured to said axle housing and arranged so that it lies wholly between parallel horizontal planes tangent to the axle housing.

2. A double reduction axle construction, comprising an axle housing and a gear housing arranged with their longitudinal axes at right angles and in the same plane; an opening and an abutment at one side of the axle housing for respectively receiving and supporting one end of the gear housing; a drive shaft projecting into the other end of the gear housing in a vertical plane which intersects the axle housing centrally thereof; an intermediate shaft mounted in the gear casing normal to said drive shaft; a pinion on the inner end of the drive shaft and a bevel gear on one end of the intermediate shaft, said gear having a substantially greater number of teeth than said pinion and in meshing engagement therewith; a second pinion mounted on the intermediate shaft adjacent the bevel gear and offset with respect to the vertical plane passing through the axis of the drive shaft; a differential housing within the axle housing and provided with a ring gear in meshing engagement with said second pinion, said ring gear likewise being offset relative to said vertical plane; differential mechanism carried within the differential housing; and interchangeable axle sections projecting into said differential housing to be driven by said mechanism.

3. An axle comprising a load carrying housing; a pair of axially aligned wheel driving shafts interchangeably journalled in said housing; a securing and locating section formed on said housing adjacent the inner ends of said wheel driving shafts with an exterior locating surface in a plane substantially parallel to the axes of said shafts; a primary driving shaft; a gear housing in which said primary drive shaft is journalled; a locating section on said gear housing shaped to fit said first mentioned locating section and to abut against said first mentioned locating surface to locate said primary driving shaft with relation to said interchangeable wheel driving shafts; a differential drive mechanism for said wheel driving shafts, supported in said axle housing by said gear housing; and reduction gearing for said differential mechanism, driven by said primary driving shaft and supported within said gear housing, said gearing comprising a pinion on the drive shaft, an intermediate shaft interposed between said locating surfaces and said pinion, a bevel gear on the intermediate shaft substantially larger than the pinion and in mesh therewith at one side of a vertical plane passing through the axis of the drive shaft, and a second pinion, mounted on the intermediate shaft with its central plane a substantial distance on the opposite side of said vertical plane and in driving engagement with said differential mechanism, said gear housing, reduction gearing and differential housing thereby being removable as a unit from said axle housing.

In testimony whereof I affix my signature.

WILLARD F. ROCKWELL.